US012579739B2

(12) United States Patent
Fletcher

(10) Patent No.: US 12,579,739 B2
(45) Date of Patent: Mar. 17, 2026

(54) 2D CONTROL OVER 3D VIRTUAL ENVIRONMENTS

(71) Applicant: Roblox Corporation, San Mateo, CA (US)

(72) Inventor: Andrea Fletcher, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 273 days.

(21) Appl. No.: 18/234,061

(22) Filed: Aug. 15, 2023

(65) Prior Publication Data

US 2025/0061648 A1 Feb. 20, 2025

(51) Int. Cl.
| | |
|---|---|
| *G06T 17/00* | (2006.01) |
| *G06F 3/04815* | (2022.01) |
| *G06T 3/40* | (2024.01) |
| *G06T 13/40* | (2011.01) |
| *G06V 10/74* | (2022.01) |

(52) U.S. Cl.
CPC .......... *G06T 17/00* (2013.01); *G06F 3/04815* (2013.01); *G06T 3/40* (2013.01); *G06T 13/40* (2013.01); *G06V 10/761* (2022.01)

(58) Field of Classification Search
CPC . G06T 17/00; G06T 3/40; G06T 13/40; G06F 3/04815; G06F 3/011; G06V 10/761
See application file for complete search history.

(56) References Cited

U.S. PATENT DOCUMENTS

| | | | | |
|---|---|---|---|---|
| 2001/0019337 A1* | 9/2001 | Kim | ...................... | G06F 16/954 |
| | | | | 709/204 |
| 2014/0129990 A1* | 5/2014 | Xin | ...................... | G06F 3/04815 |
| | | | | 715/849 |
| 2018/0348987 A1* | 12/2018 | Sawaki | ................... | G06F 3/011 |
| 2021/0193084 A1* | 6/2021 | Deliz Centeno | ....... | G09G 5/373 |
| 2022/0258048 A1* | 8/2022 | Yu | ........................... | A63F 13/48 |
| 2024/0203410 A1* | 6/2024 | Carbune | ................ | G06F 3/167 |

* cited by examiner

*Primary Examiner* — Jitesh Patel
(74) *Attorney, Agent, or Firm* — IP Spring

(57) ABSTRACT

Implementations described herein relate to methods, systems, and computer-readable media for 2D control over a 3D virtual environment. A method may include providing a 3D virtual experience, receiving first indication that the avatar is within a threshold distance of at least one interactive displayed graphical element and second indication that the at least one interactive displayed graphical element is within a viewport, receiving an activation signal to activate a 2D interaction mode, automatically providing a projection of the at least two portions onto a 2D plane within the viewport associated with the avatar responsive to the activation signal and the indications, receiving a selection of one or more of the bounding box representations, and performing a function associated with the selection, the function identical to an associated function of the at least one interactive graphical element.

18 Claims, 11 Drawing Sheets

100

100

2D CONTROL OVER 3D VIRTUAL ENVIRONMENTS

TECHNICAL FIELD

Embodiments relate generally to virtual experiences, and more particularly, to methods, systems, and computer readable media for 2D control over 3D virtual environments.

BACKGROUND

Virtual experiences, such as three-dimensional (3D) meta-verse environments, include immersive experiences having objects, elements, and various other 3D renderings for interaction with by a user. Generally, virtual experiences may also include control elements, menus, objects, items, and other similar elements. Many virtual experiences require an avatar to interact with these elements within the 3D space, for example, using a terminal portion of the avatar (e.g., a hand, finger, etc.) to point or directly interact with a portion of the element. However, some users may find it difficult to interact with these elements and/or may have difficulty accurately activating one or more portions of a control element in 3D space.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to an aspect, a computer-implemented method is provided. The computer-implemented method includes: providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar; receiving first indication that the avatar is within a threshold distance of the at least one interactive displayed graphical element within the virtual experience and second indication that the at least one interactive displayed graphical element is within a viewport associated with the avatar; receiving an activation signal to activate the 2D interaction mode; in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar; receiving a selection of one or more of the bounding box representations; and performing a function associated with the selection, the function identical to an associated function of the at least one interactive graphical element.

In some implementations, the at least two portions of the at least one interactive graphical element are 3D elements rendered for display onto the at least one interactive graphical element, and wherein the bounding box representations are projections of the 3D elements onto 2D space.

In some implementations, the threshold distance is a distance measured from the viewport associated with the avatar to the at least one interactive graphical element in the virtual experience.

In some implementations, the second indication that the at least one interactive graphical element is within the viewport further comprises indication that a view of the at least one graphical element from the avatar has less than a threshold amount of obstruction.

In some implementations, the threshold amount of obstruction is fifty percent obstruction.

In some implementations, the activation signal is a toggle signal controlled by a user associated with the avatar, and wherein the toggle signal is controlled by one or more of: a selectable keyboard key, a hot key combination on a keyboard, a dedicated button on a gamepad, a button on a mobile device, or a graphical user interface element rendered on a display device.

In some implementations, the method further comprises scaling the provided projection to match a size of the at least one interactive displayed graphical element based upon an actual distance between the viewport and the at least one interactive graphical element, and from a perspective of the avatar.

In some implementations, the bounding box representations are non-overlapping.

In some implementations, each bounding box is an interactive element linked to an associated portion of the separate portions.

In some implementations, the method further comprising: receiving third indication that: the avatar is not within the threshold distance, the at least one interactive displayed graphical element is not viewable within the viewport, and/or the activation signal is not active; and deactivating the provided projection responsive to the third indication.

According to another aspect, a non-transitory computer-readable storage medium is disclosed, with instructions stored thereon that, responsive to execution by a processing device, causes the processing device to perform operations comprising: providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar; receiving first indication that the avatar is within a threshold distance of the at least one interactive displayed graphical element within the virtual experience and second indication that the at least one interactive displayed graphical element is within a viewport associated with the avatar; receiving an activation signal to activate the 2D interaction mode; in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar; receiving a selection of one or more of the bounding box representations; and performing a function associated with the selection, the function identical to an associated function of the at least one interactive graphical element.

Various implementations of the non-transitory computer readable storage medium are described.

In some implementations, the at least two portions of the at least one interactive graphical element are 3D elements rendered for display onto the at least one interactive graphical element, and wherein the bounding box representations are projections of the 3D elements onto 2D space.

In some implementations, the threshold distance is a distance measured from the viewport associated with the avatar to the at least one interactive graphical element in the virtual experience.

In some implementations, the second indication that the at least one interactive graphical element is within the viewport further comprises indication that a view of the at least one graphical element from the avatar has less than a threshold amount of obstruction.

In some implementations, the threshold amount of obstruction is fifty percent obstruction.

In some implementations, the activation signal is a toggle signal controlled by a user associated with the avatar, and wherein the toggle signal is controlled by one or more of: a selectable keyboard key, a hot key combination on a keyboard, a dedicated button on a gamepad, a button on a mobile device, or a graphical user interface element rendered on a display device.

In some implementations, the operations further comprise scaling the provided projection to match a size of the at least one interactive displayed graphical element based upon an actual distance between the viewport and the at least one interactive graphical element, and from a perspective of the avatar.

In some implementations, the bounding box representations are non-overlapping, and wherein each bounding box is an interactive element linked to an associated portion of the separate portions.

In some implementations, the operations further comprise: receiving third indication that: the avatar is not within the threshold distance, the at least one interactive displayed graphical element is not viewable within the viewport, and/or the activation signal is not active; and deactivating the provided projection responsive to the third indication.

According to yet another aspect, a system is disclosed, the system comprising: a memory with instructions stored thereon; and a processing device, coupled to the memory and operable to access the memory, wherein the instructions when executed by the processing device, cause the processing device to perform operations including: providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar; receiving first indication that the avatar is within a threshold distance of the at least one interactive displayed graphical element within the virtual experience and second indication that the at least one interactive displayed graphical element is within a viewport associated with the avatar; receiving an activation signal to activate the 2D interaction mode; in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar; receiving a selection of one or more of the bounding box representations; and performing a function associated with the selection, the function identical to an associated function of the at least one interactive graphical element According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
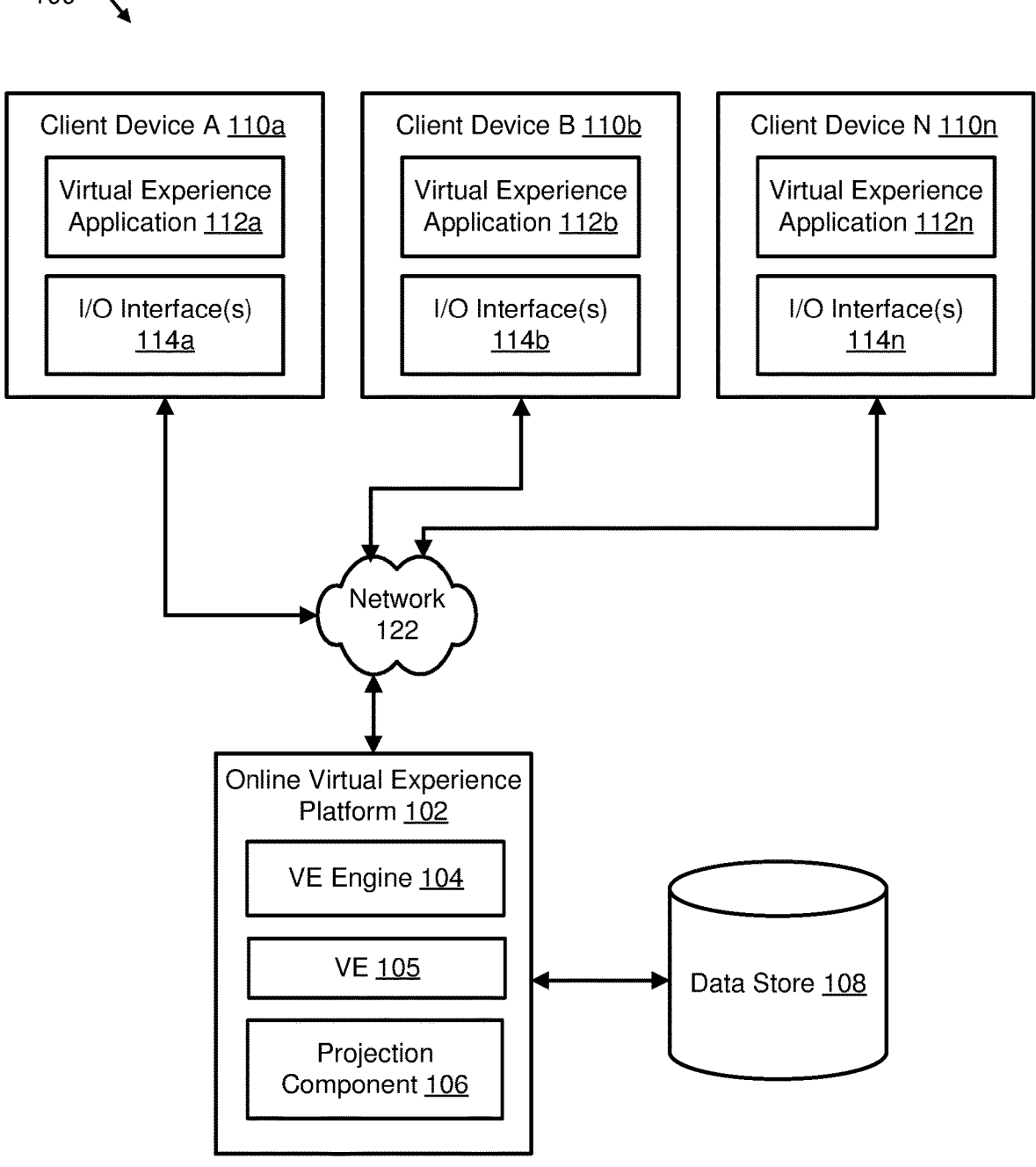
FIG. 1 is a diagram of an example network environment for computer-assisted graphical development tools, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

In some aspects, systems and methods are provided for two dimensional (2D) control over a three dimensional (3D) virtual environment within a virtual experience. Online platforms, such as online virtual experience platforms, generally provide an ability to create, store, place, and interact with virtual items to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual experiences and associated virtual items. Virtual items may be presented in a search interface or inventory screen, whereby users may peruse virtual items, search for new virtual items, and/or purchase virtual items prior to entering a virtual experience.

While search interfaces and inventory screens allow users to search for items, virtual experiences also provide an immersive experience for a user. For example, avatars may move about virtual experiences and interact with a plurality of virtual items in a typical virtual experience. Furthermore, other virtual elements, such as buttons, controls, levers, objects, and others, may be presented for interaction with by an avatar.

In these examples, an avatar may use a terminal end (e.g., such as a digit, hand, or other terminal end) to depress buttons, pick up objects, pull levers, and others. The avatar may interact in these and other manners within the 3D virtual environment by a user inputting commands to move the avatar about the virtual environment and interact with objects and elements therein.

However, many users utilize different control devices to input commands. For example, some users utilize a keyboard, while others a gamepad, and still others may use a touchscreen interface. Other input devices may also be applicable, including buttons, joysticks, keys, and others. As the virtual elements, items, objects, and other virtual items are presented within a 3D environment, the avatar must be maneuvered to within an interaction distance, and directed to perform an interaction, by the user using the input device.

In these and other scenarios, the user may ascertain or judge a distance to an object, direct the avatar to approach the object, and subsequently direct the avatar to interact with the object. However, as different virtual objects may be placed in different orientations within a 3D virtual environment, it may be difficult for a user to accurately select a particular object depending upon where the object is arranged in virtualized 3D space.

For example, if a first object is obscured in 3D space by a second object, it may be difficult for the avatar to interact with the first object without selecting the second object instead. For example, if a third object is larger than the second object and between the avatar and the first and second objects, it may be difficult for the avatar to interact with either the first or second objects without first interacting with the third object. In these and other examples, selection of particular objects becomes cumbersome for users and may detract from enjoyment.

However, according to implementations and embodiments described herein in detail, an online virtual experience platform may deploy a projection component at a server to enable 2D control over objects in the 3D environment. The projection component, by considering an avatar's viewport, perspective, and orientation, may project bounding boxes onto a 2D plane that allow selection of 3D objects through selection of portions of the 2D plane. The bounding boxes, being projected onto 2D plane, allow for selection of objects in both the foreground and background if a portion of the object is viewable. In this manner, a user may easily select objects for interaction by generally pointing, clicking, and/or selecting the portion on the 2D projection instead of interacting directly within 3D space.

According to implementations and embodiments described herein, a selection key may operate to activate the 2D projections through an activation signal. For example, the activation signal may be a toggle signal controlled by a user associated with the avatar. The toggle signal can be controlled by a selectable keyboard key, a hot key combination on a keyboard, a dedicated button on a gamepad, a button on a mobile device, and/or a graphical user interface element rendered on a display device, amongst other examples.

While the toggle signal is active, the bounding boxes may be projected onto the 2D plane such that the avatar may more easily select different elements to interact with. Upon deactivation of the signal (e.g., or manipulation of the toggle to a different state), the 2D interaction scheme may cease, such that the avatar may continue to interact within the 3D environment according to 3D controls.

These and other suitable example implementations will become apparent in this disclosure.

Hereinafter, further details surrounding example embodiments and various aspects of this disclosure are described with reference the many figures.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The network environment 100 (also referred to as a "platform" herein) includes an online virtual experience server 102, a data store 108, and a client device 110 (or multiple client devices 110*a*-110*n*), all connected via a network 122.

The online virtual experience server 102 can include, among other things, a virtual experience engine 104, one or more virtual experiences 105, a projection component 106 and/or a virtual experience application 107. The online virtual experience server 102 may be configured to provide virtual experiences 105 to one or more client devices 110, and to provide 2D projections of bounding boxes via the projection component 106, in some implementations.

Data store 108 is shown coupled to online virtual experience server 102 but in some implementations, can also be provided as part of the online virtual experience server 102. The data store may, in some implementations, be configured to store object data, avatar data, control data, and/or other spatial data in association with the projection component 106.

The client devices 110 (e.g., 110*a*, 110*b*, 110*n*) can include a virtual experience application 112 (e.g., 112*a*, 112*b*, 112*n*) and an I/O interface 114 (e.g., 114*a*, 114*b*, 114*n*), to interact with the online virtual experience server 102, and to view, for example, graphical user interfaces (GUI) through a computer monitor or display (not illustrated). In some implementations, the client devices 110 may be configured to execute and display virtual experiences and 2D projections of bounding boxes as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 107/112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience and in association with the projection component 106, a user's avatar may view one or more objects, items, controls, or others in 3D space. Using data related to proximity and orientation of the avatar (and in particular the avatar's viewport), the projection component 106 may project 2D bounding boxes onto a 2D plane such that edges of viewable portions of the objects are selectable based on X, Y coordinates rather than X, Y, Z coordinates. For example, a user may select a bounding box rather than direct the avatar to approach, avoid obstacles, change orientation, and select a particular object/item.

The projection component 106 may operate by first determining whether an avatar is within a threshold distance from one or more objects. Thereafter, a user may select an activation signal to enter 2D interaction mode. During 2D interaction mode, or prior to entering 2D interaction mode, the projection component 106 determines which objects are viewable from the perspective of the avatar's viewport. Thereafter, the projection component 106 may project invisible bounding boxes over the viewable portions. Thus, while in 2D interaction mode, a user may depress, click on, traverse, and otherwise select the different objects by interacting with a simple 2D control scheme. For example, a user may use left/right and up/down controls to move between objects in the 2D interaction mode. For example, a user may select objects on a touchscreen in the 2D interaction mode. For example, a user may use a joystick to move up/down and left/right between different objects in the 2D interaction mode. Other example control interactions based on traversing a 2D plane are applicable to some implementations, and all such variations are within the scope of this disclosure.

Figure 2:
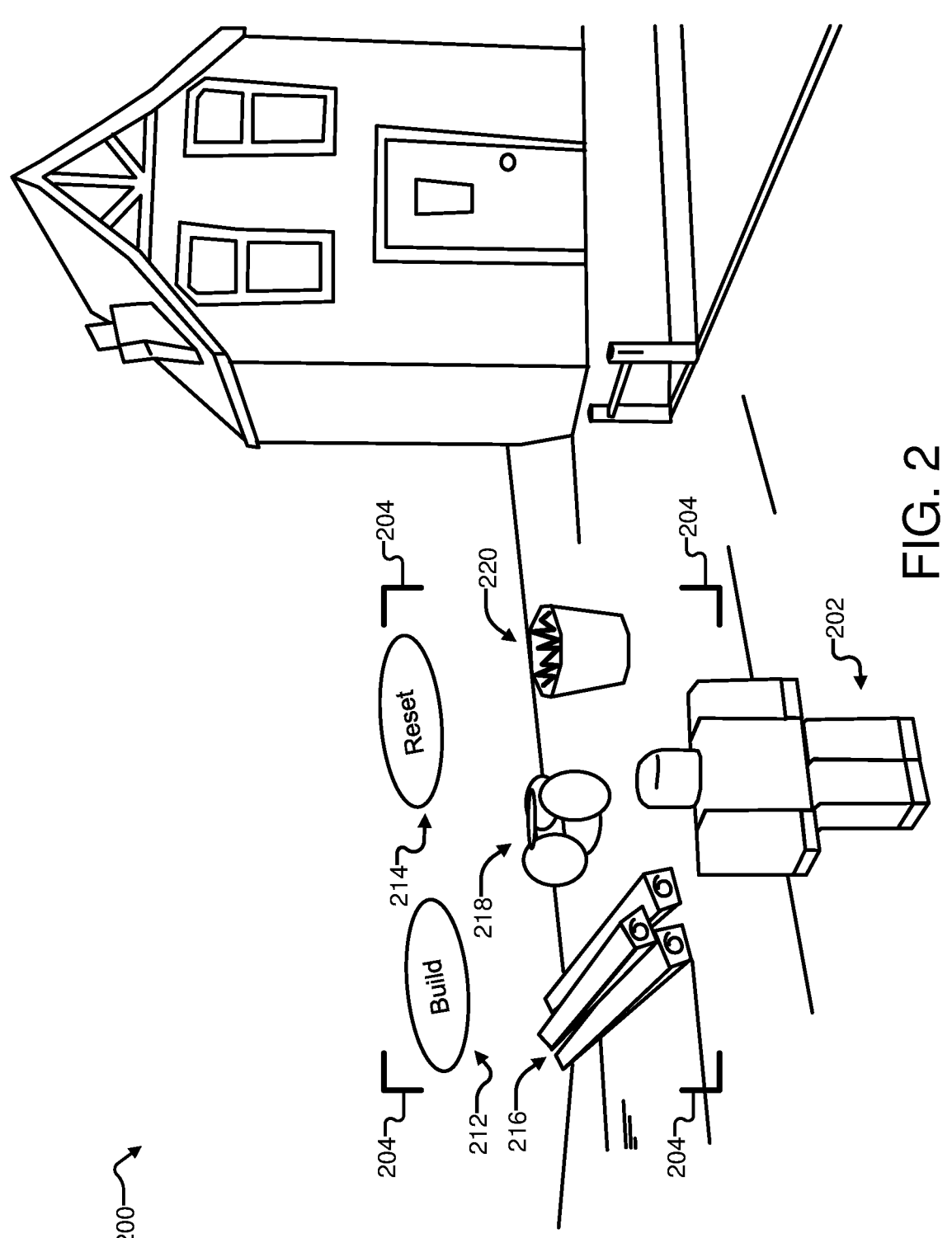
FIG. 2 is a schematic of a virtual environment of a virtual experience, in accordance with some implementations.

Hereinafter, a more detailed discussion of projection of bounding boxes are presented with reference to FIGS. 2-3. FIGS. 2-3 Virtual Environments and Controls FIG. 2 is a schematic of a virtual environment 200 of a virtual experience, in accordance with some implementations. The virtual environment 200 may be a 3D virtual environment of a virtual experience 105 provided by the online virtual experience platform 102.

As illustrated, the particular virtual environment 200 may include an avatar 202 associated with a user, and a plurality of virtual objects and virtual controls 212, 214, 216, 218, and 220. As further illustrated, a viewport 204 of the avatar is denoted with corner markers.

The avatar 202 may be within the threshold activation distance of the objects. If the user depresses a control key to toggle the activation signal described above while within the threshold distance, the projection component 106 may determine which objects are viewable by the avatar 202 within the viewport 204. The projection component 106 may also determine if an object is not viewable, for example, through ray casting to ensure obfuscated objects are not displayed.

In some implementations, if an object is more than 50% obfuscated then the projection component 106 may not render the object and/or a bounding box for the object. In some implementations, if an object is more than about 50% obfuscated then the projection component 106 may not render the object and/or a bounding box for the object. In some implementations, if an object is more than about 30-50% obfuscated then the projection component 106 may not render the object and/or a bounding box for the object. Other preferences and/or default levels of obfuscation may be chosen according to any desired implementation of the technologies described herein.

The projection component 106 may, for example, render a 2D image of the 3D environment 200 onto the viewport 204 such that a 2D view of the environment 200 is presented in the avatar viewport 204. Turning now to FIG. 3, several different views of the avatar viewport 204 are provided to aid in illustrating the 2D projections of bounding boxes.

Figure 3A:
FIG. 3A is a schematic of a portion of the virtual environment of FIG. 2 illustrated as viewed through a viewport, in accordance with some implementations.
Figure 3A:
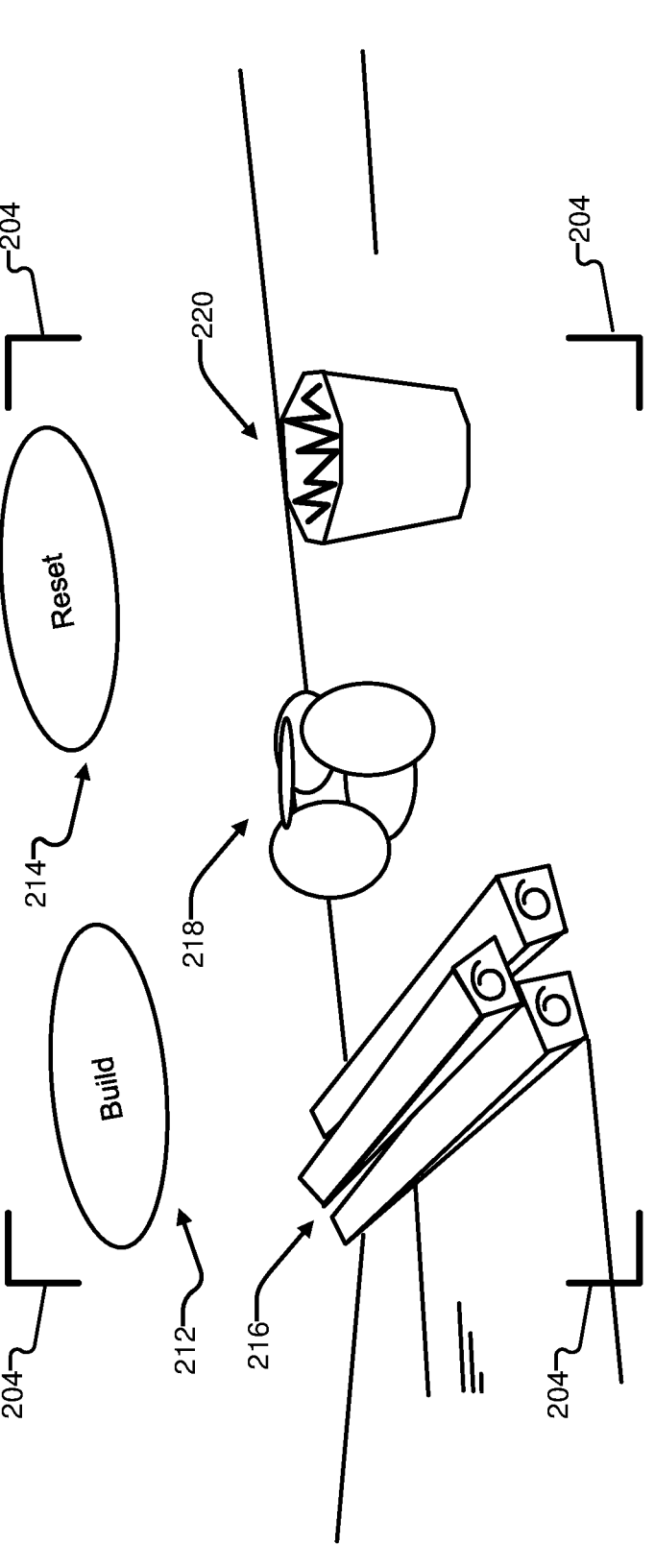

FIG. 3A is a schematic of a portion of the virtual environment of FIG. 2 illustrated as viewed through a viewport, in accordance with some implementations. As illustrated, the viewport 204 is presented with all visible and non-obfuscated objects presently rendered. The view illustrated in FIG. 3A may be viewed by a user at a display screen and may not visibly show bounding boxes. However, as shown in FIG. 3B, bounding boxes may be rendered by the projection component 106.

Figure 3B:
FIG. 3B is a schematic of a viewport with an automated projection of bounding boxes, in accordance with some implementations.
Figure 3B:
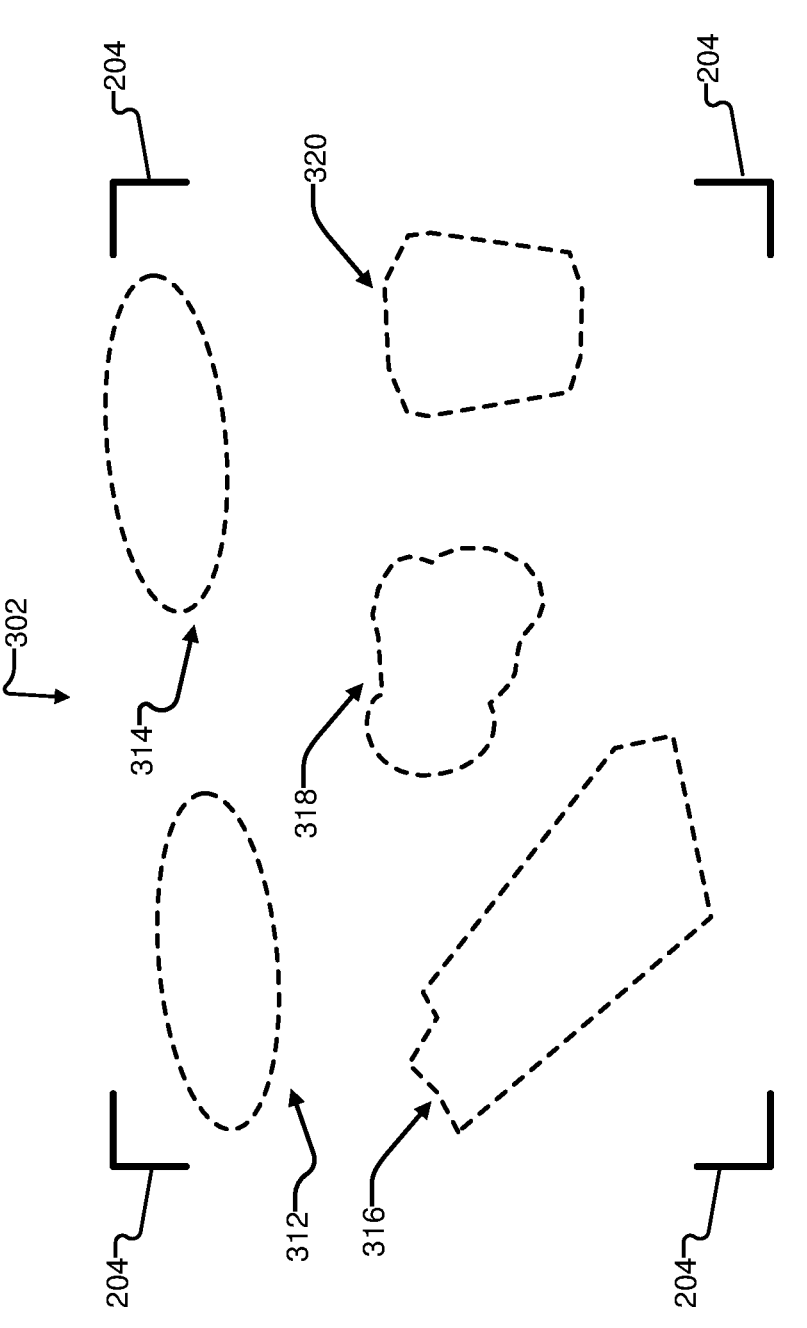

FIG. 3B is a schematic of the viewport 204 with an automated projection of bounding boxes, in accordance with some implementations. As shown, FIG. 3B is a simplified view depicting dashed lines for the invisible bounding boxes projected onto the viewport. The bounding box 312 corresponds to objects 212. The bounding box 314 corresponds to objects 214. The bounding box 316 corresponds to objects 216. The bounding box 318 corresponds to objects 218. The bounding box 320 corresponds to objects 220.

While the simplified view of FIG. 3B is provided for illustrative purposes of how bounding boxes may be projected onto a 2D plane, it is noted that in some implementations, it may be desirable to display the bounding boxes as shown. In these implementations, the bounding box displays may be useful for debugging, for accessibility options for impaired users, and for other purposes.

Figure 3C:
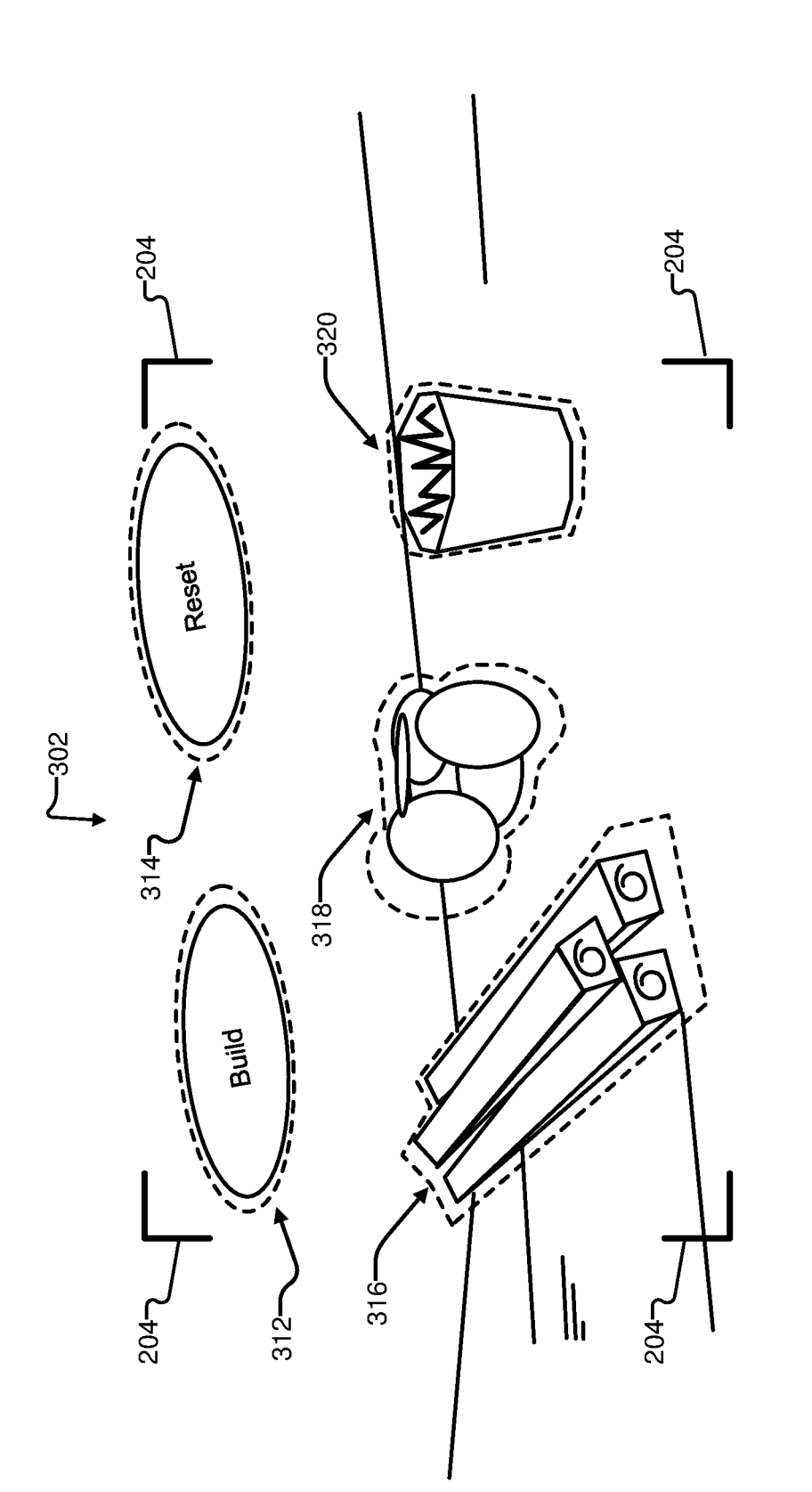
FIG. 3C is a schematic of a portion of the virtual environment of FIG. 2 with an automated projection of bounding boxes onto a viewport or 2D plane, in accordance with some implementations.

FIG. 3C is a schematic of a portion of the virtual environment of FIG. 2 with an automated projection of bounding boxes onto a viewport or 2D plane, in accordance with some implementations. As shown in FIG. 3C, exaggerated bounding boxes 312, 314, 316, 318, and 320 are illustrated to shown correspondence between bounding boxes and virtual objects.

While the simplified view of FIG. 3C is provided for illustrative purposes of how bounding boxes may be projected onto a 2D plane and how said bounding boxes correspond to virtual items, it is noted that in some implementations, it may be desirable to display the bounding boxes together with objects as shown. In these implementations, the bounding box displays may be useful for debugging, for accessibility options for impaired users, and for other purposes.

Figure 3D:
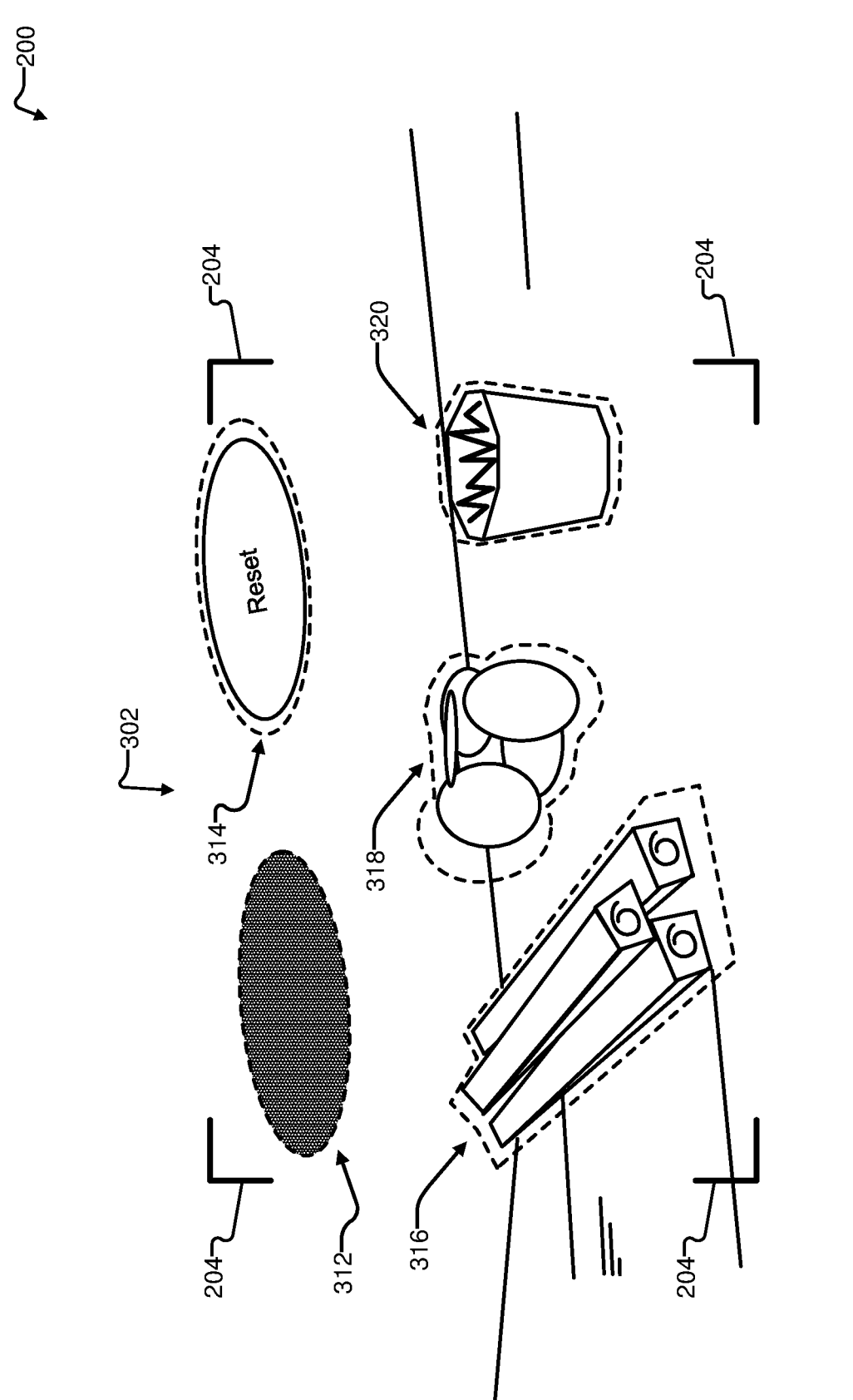
FIG. 3D is a schematic of a viewport illustrating a highlighted selection, in accordance with some implementations.

FIG. 3D is a schematic of a viewport illustrating a highlighted selection, in accordance with some implementations. As shown in FIG. 3D, while the activation signal is toggled 'ON', a user may select different virtual objects by selecting them through the 2D projections. For example, object 212 has been selected by selection of any area within bounding box 312.

Figure 3E:
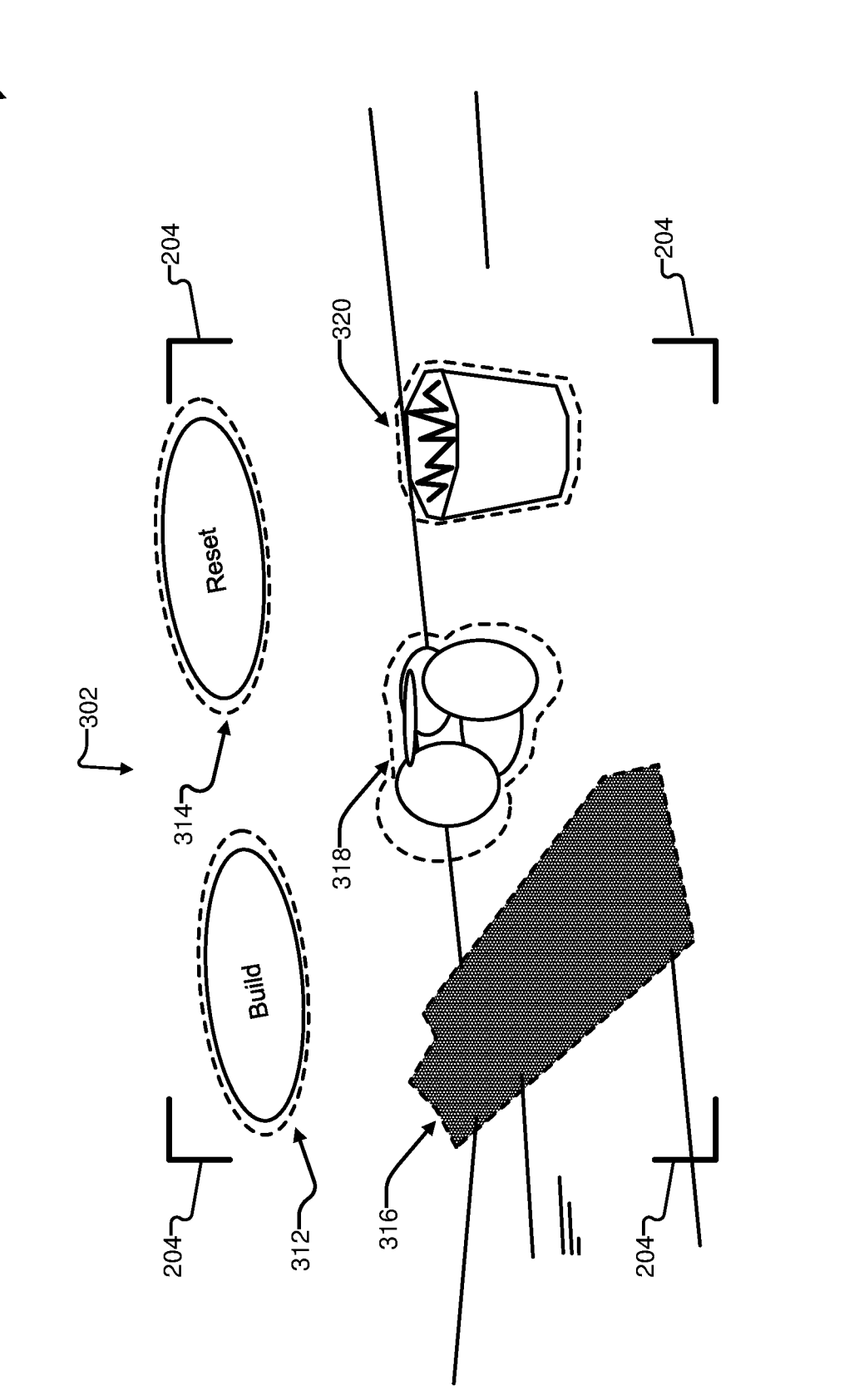
FIG. 3E is a schematic of a viewport illustrating a different highlighted selection, in accordance with some implementations.

FIG. 3E is a schematic of a viewport illustrating a different highlighted selection, in accordance with some implementations. As shown in FIG. 3E, while the activation signal is toggled 'ON', a user may traverse through different virtual objects using simple 2D commands (e.g., up/down, left/right, etc.). For example, object 216 has been selected by depressing a down key on a keyboard to change to a selection of bounding box 316.

Figure 3F:
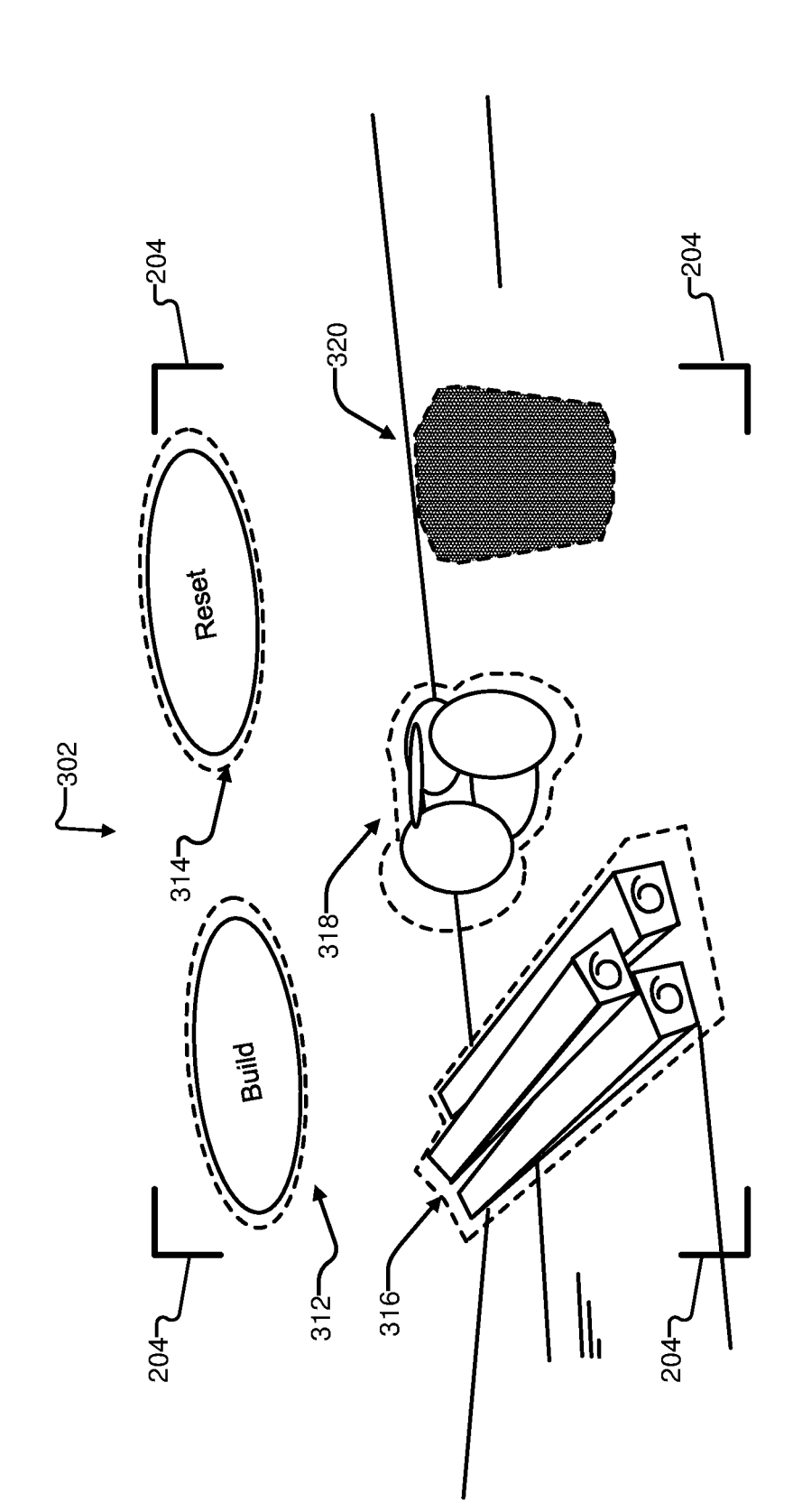
FIG. 3F is a schematic of a viewport illustrating a different highlighted selection, in accordance with some implementations.

FIG. 3F is a schematic of a viewport illustrating a different highlighted selection, in accordance with some implementations. As shown in FIG. 3F, while the activation signal is toggled 'ON', a user may traverse through different virtual objects using simple 2D commands (e.g., up/down, left/right, etc.). For example, object 220 has been selected by pushing a joystick to the right, twice, to change to a selection of bounding box 320.

The control schemes described above may be a 2D interaction mode, by which a user may select different objects through a 2D interface, in lieu of a native 3D interface of a virtual experience. Upon re-selection of the toggle signal to turn the toggle 'OFF', a user may revert to typical 3D controls within the 3D virtual environment 200. Furthermore, upon approaching the same or different objects and selection of the toggle signal, new 2D projections may be rendered onto the viewport such that the user can select different objects more easily compared to conventional 3D control schemes.

Hereinafter, operation of the projection component 106 and other components of the online virtual experience platform 102 are provided with reference to FIGS. 4-5.

Figure 4:
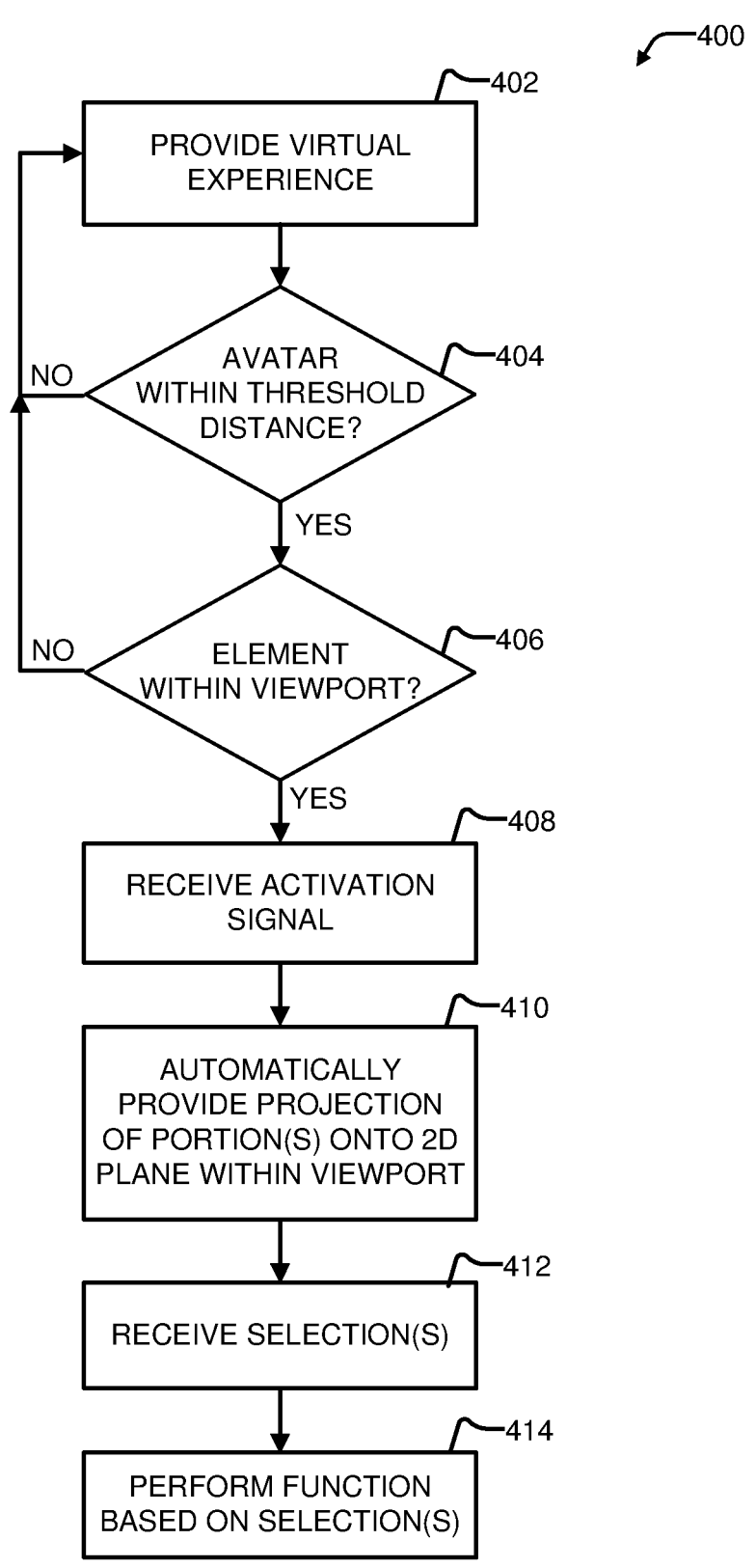
FIG. 4 is a flowchart illustrating an example method of 2D control over 3D environments, in accordance with some implementations.
Figure 5:
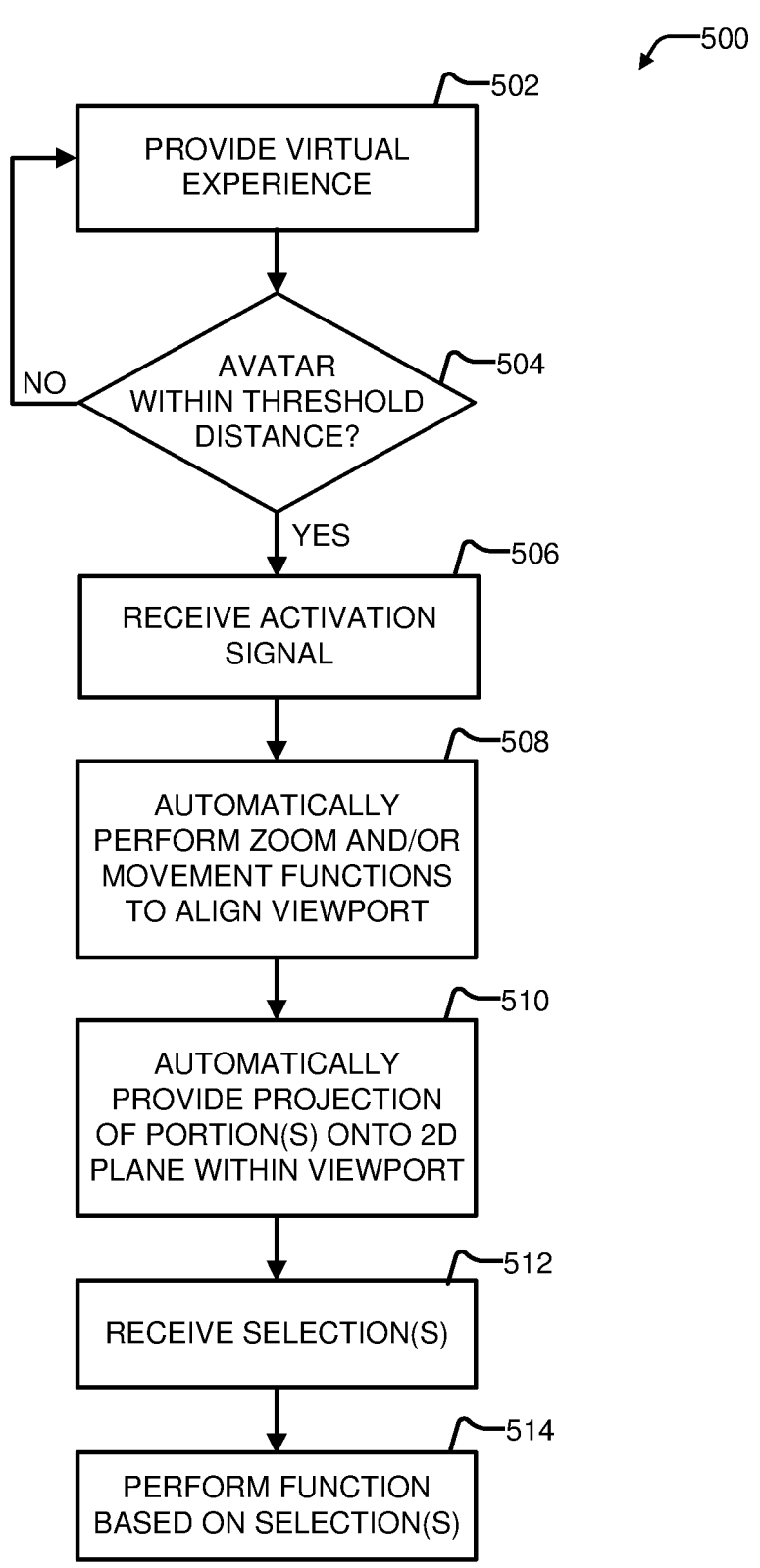
FIG. 5 is a flowchart illustrating another example method of 2D control over 3D environments, in accordance with some implementations.

FIGS. 4-5: Methods of Operation

FIG. 4 is a flowchart illustrating an example method of 2D control over 3D environments, in accordance with some implementations. In some implementations, method 400 can be implemented, for example, at an online virtual experience platform 102 similar as described with reference to FIG. 1. In some implementations, method 400 can be implemented, for example, on server 102 described with reference to FIG. 1. In some implementations, some or all of the method 400 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 108, or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., a number of objects viewable in a view port changes, orientation of an avatar changes, and/or one or more other conditions occurring which can be specified in settings read by the method.

The method 400 begins at block 402. At block 402, a virtual experience (e.g., similar to virtual experience 200 or another experience) may be provided. In some implementations, the virtual experience is provided to a virtual experience application executing on a client device. In some implementations, the virtual experience is provided to a server executing a virtual experience engine. In this example, the virtual experience engine may serve at least a portion of the virtual experience for rendering at a client device.

In some implementations, the provided virtual experience is a 3D virtual experience or a multi-dimensional virtual experience. In some implementations, the provided virtual experience includes at least one interactive displayed graphical element and a two-dimensional (2D) interaction mode. For example, the displayed graphical element may be a virtual item, a virtual object, a virtual control panel, a virtual button, a set of virtual buttons, a virtual lever, and/or other virtual objects.

In some implementations, the displayed graphical element may include at least two portions for interaction with by an avatar, for example, either two or more individual items or two or more individual control elements. In these examples, a bounding box is projected for each interactive portion or element of the object.

It is noted that in some implementations, instead of a single object with two or more portions, two or more objects are applicable. In these examples, a bounding box for each object is projected.

It is noted that in some implementations, a mix of multiple objects and objects having two or more interactive elements may also be applicable. In these examples, a bounding box is projected for each interactive portion and for each interactive object.

In some implementations, the 2D interaction mode is activatable by the avatar or a user in control of the avatar. For example, in some implementations, a user may activate the 2D interaction mode or toggle the activation signal, by operating a control key, hot key, button, and/or other control input. Block 402 is followed by block 404.

At block 404, it is determined whether the avatar is within a threshold distance of the object or objects (e.g., a first indication). For example, if the avatar is within a threshold distance, the method continues to block 406. Else, the method iterates between blocks 402-404 until the avatar is within threshold distance.

In some implementations, the threshold distance is a user-configurable variable based upon a resolution of an available display. In some implementations, the threshold distance is a preconfigured distance set by a developer of the virtual experience, the developer of a particular virtual object, and/or an operator of the virtual experience platform 102.

At block 406, it is determined whether the element or elements are within the viewport of the avatar. For example, the projection component 106 may determine viewability of objects. In some implementations, a viewability must be between 50-100% to be considered viewable within the viewport. In some implementations, a viewability muse by above 50% to be considered viewable within the viewport. In some implementations, a viewability must by above about 30-50% to be considered viewable within the viewport. Other variations may also be applicable.

For example, if elements are within the viewport, the method continues to block 408. Else, the method iterates between blocks 402-406 until the avatar is within threshold distance and includes interactive elements within its viewport for projection of controls.

At block 408, an activation signal may be received. In some implementations, the activation signal is a toggle signal controlled by a user associated with the avatar. In some implementations, the toggle signal is controlled by one or more of: a selectable keyboard key, a hot key combination on a keyboard, a dedicated button on a gamepad, a button on a mobile device, or a graphical user interface element rendered on a display device. Block 408 is followed by block 410.

At block 410, a projection of portions of the elements that are viewable within the viewport, is automatically provided. The projection is of the viewable portions of the elements on a 2D plane. For example, FIGS. 3A-3F illustrated projections within a viewport for selection by a user. Block 410 is followed by block 412.

At block 412, one or more selections are received from the user. For example, a user may traverse the 2D plane projections to select any viewable object projected onto. For example, a simplified 2D interaction mode may be active such that the user may use directional controls in 2 directions, 4 directions, 8 directions, or more, to accurately select individual bounding boxes and the underlying elements. Block 412 is followed by block 414.

At block 414, a function based on the underlying selection is performed. The function performed is exactly the same as the function that would be performed if the object/element were selected in 3D space. In this manner, the method 400 provides for 2D selection of objects that are arranged in a 3D space. The selection may be made with simplified 2D directional controls, touch input, mouse input, and others. Upon making the selection, a function (or motion, or control, etc.) associated with the underlying element may be performed.

As described above, a method can include providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar.

The method may also include receiving first indication that the avatar is within a threshold distance of the at least one interactive displayed graphical element within the virtual experience and second indication that the at least one interactive displayed graphical element is within a viewport associated with the avatar. The method also includes receiving an activation signal to activate the 2D interaction mode, for example, a toggle signal.

The method may also include, in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar.

The method may also include receiving a selection of one or more of the bounding box representations, and performing a function associated with the selection, the function identical to an associated function of the at least one interactive graphical element.

Hereinafter, an alternative method is presented with reference to FIG. 5.

FIG. 5 is a flowchart illustrating another example method of 2D control over 3D environments, in accordance with some implementations. In some implementations, method 500 can be implemented, for example, at an online virtual experience platform 102 similar as described with reference to FIG. 1. In some implementations, method 500 can be implemented, for example, on server 102 described with reference to FIG. 1. In some implementations, some or all of the method 500 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 108, or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a number of objects viewable in a view port changes, orientation of an avatar changes, and/or one or more other conditions occurring which can be specified in settings read by the method.

The method 400 begins at block 502. At block 502, a virtual experience (e.g., similar to virtual experience 200 or another experience) may be provided. In some implementations, the virtual experience is provided to a virtual experience application executing on a client device. In some implementations, the virtual experience is provided to a server executing a virtual experience engine. In this example, the virtual experience engine may serve at least a portion of the virtual experience for rendering at a client device.

In some implementations, the provided virtual experience is a 3D virtual experience or a multi-dimensional virtual experience. In some implementations, the provided virtual experience includes at least one interactive displayed graphical element and a two-dimensional (2D) interaction mode. For example, the displayed graphical element may be a virtual item, a virtual object, a virtual control panel, a virtual button, a set of virtual buttons, a virtual lever, and/or other virtual objects.

In some implementations, the displayed graphical element may include at least two portions for interaction with by an avatar, for example, either two or more individual items or two or more individual control elements. In these examples, a bounding box is projected for each interactive portion or element of the object.

It is noted that in some implementations, instead of a single object with two or more portions, two or more objects are applicable. In these examples, a bounding box for each object is projected.

It is noted that in some implementations, a mix of multiple objects and objects having two or more interactive elements may also be applicable. In these examples, a bounding box is projected for each interactive portion and for each interactive object.

In some implementations, the 2D interaction mode is activatable by the avatar or a user in control of the avatar. For example, in some implementations, a user may activate the 2D interaction mode or toggle the activation signal, by operating a control key, hot key, button, and/or other control input. Block 502 is followed by block 504.

At block 504, it is determined whether the avatar is within a threshold distance of the object or objects (e.g., a first indication). For example, if the avatar is within a threshold distance, the method continues to block 506. Else, the method iterates between blocks 502-504 until the avatar is within threshold distance.

In some implementations, the threshold distance is a user-configurable variable based upon a resolution of an available display. In some implementations, the threshold distance is a preconfigured distance set by a developer of the virtual experience, the developer of a particular virtual object, and/or an operator of the virtual experience platform 102.

At block 506, an activation signal may be received. In some implementations, the activation signal is a toggle signal controlled by a user associated with the avatar. In some implementations, the toggle signal is controlled by one or more of: a selectable keyboard key, a hot key combination on a keyboard, a dedicated button on a gamepad, a button on a mobile device, or a graphical user interface element rendered on a display device. Block 506 is followed by block 508.

At block 508, the projection component 106 in concert with other components of the online virtual experience platform 102, may automatically perform zoom, pan, and/or movement functions such that objects within threshold distance of the avatar are brought into focus within the avatar's viewport. In this manner, if the avatar is close to some objects, and if a user activates the activation signal, the system may automatically, change the orientation of the avatar such that the nearby objects are viewable within the viewport.

In some implementations, the avatar's viewport is re-oriented until a maximum or near maximum number of elements within the threshold distance are viewable. In this example, a simple algorithm may be performed to locate a local maximum of viewable elements based on available orientations and threshold distances. In some implementations, the avatar's viewport is re-oriented to face the closest virtual element upon activation of the activation signal. Other variations may also be applicable.

In some implementations, the avatars viewport is re-oriented when receiving the activation signal to zoom and focus on the currently activated element such that it takes up the majority of the screen. For a complex series of input in one 3D UI element this can allow increased legibility or maximum legibility, and focus of the virtual elements.

Block 508 is followed by block 510.

At block 510, a projection of portions of the elements that are viewable within the viewport, is automatically provided. The projection is of the viewable portions of the elements on a 2D plane. For example, FIGS. 3A-3F illustrated projections within a viewport for selection by a user. Block 510 is followed by block 512.

At block 512, one or more selections are received from the user. For example, a user may traverse the 2D plane projections to select any viewable object projected onto. For example, a simplified 2D interaction mode may be active such that the user may use directional controls in 2 directions, 4 directions, 8 directions, or more, to accurately select individual bounding boxes and the underlying elements. Block 512 is followed by block 514.

At block 514, a function based on the underlying selection is performed. The function performed is exactly the same as the function that would be performed if the object/element were selected in 3D space. In this manner, the method 500 provides for 2D selection of objects that are arranged in a 3D space. The selection may be made with simplified 2D directional controls, touch input, mouse input, and others. Upon making the selection, a function (or motion, or control, etc.) associated with the underlying element may be performed. Furthermore, the method 500 provides for auto-matic zoom, pan, and movement functions to ensure that nearby objects are made selectable on a 2D plane for users selecting or activating the activation signal within threshold distance of interactable objects/elements.

Hereinafter, details related to computing devices that may be used to implement the above and other features are described with reference to FIG. 6.

Figure 6:
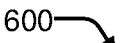
FIG. 6 is a block diagram illustrating an example computing device, in accordance with some implementations.
Figure 6:
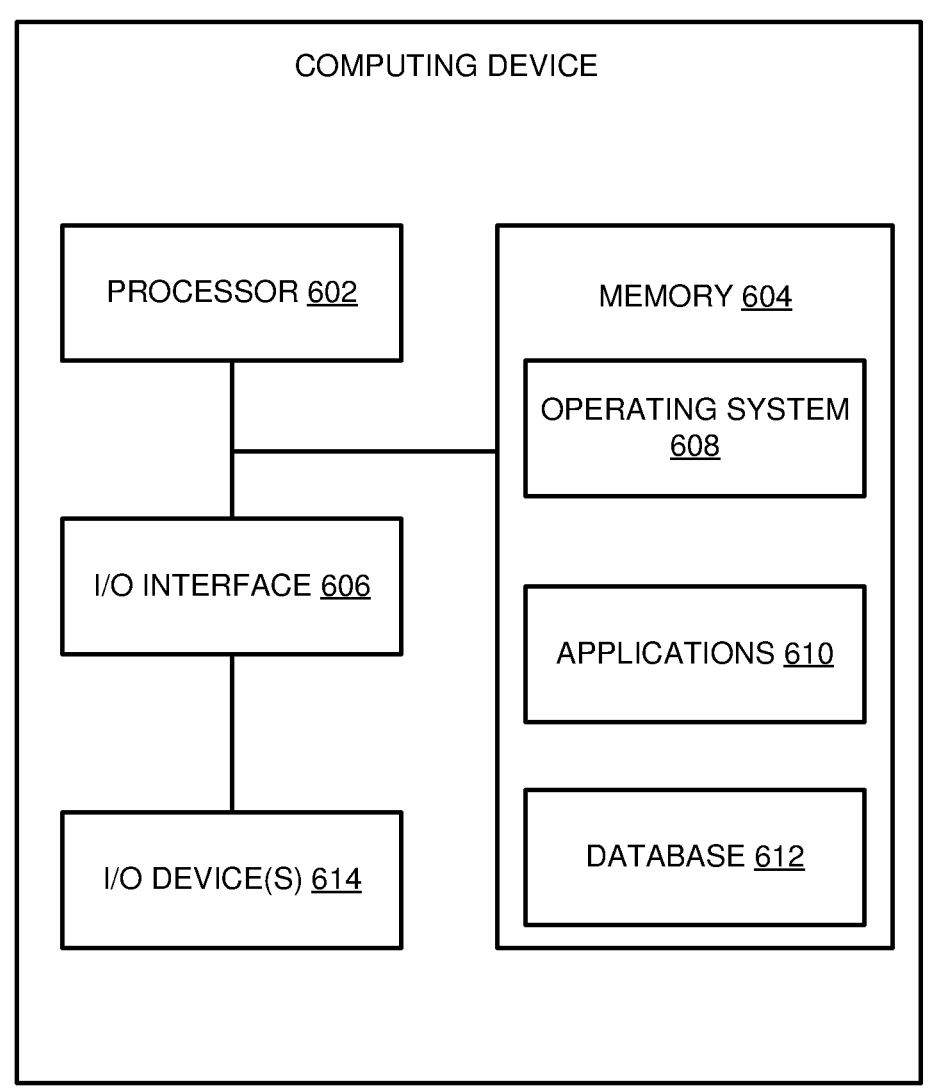

FIG. 6: Computing Devices

FIG. 6 is a block diagram of an example computing device 600 which may be used to implement one or more features described herein. In one example, device 600 may be used to implement a computer/client device (e.g., 110 of FIG. 1), and perform appropriate method implementations (e.g., 400 of FIG. 4 and 500 of FIG. 5) described herein. Computing device 600 can be any suitable computer system, server, or other electronic or hardware device. For example, the computing device 600 can be a mainframe computer, desktop computer, workstation, portable computer, or elec-tronic device (portable device, mobile device, cell phone, smartphone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other informa-tion. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of process-ing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software oper-ating on the server device 600 by the processor 602, includ-ing an operating system 608, one or more applications 610, and database 612. In some implementations, application 610 can include instructions that enable processor 602 to per-form the functions (or control the functions of) described herein, e.g., some or all of the methods described with respect to FIG. 4 and FIG. 5.

For example, applications 610 can include a graphical application (e.g., to allow graphical content creation and placement of 3D controls to be eventually automatically projected onto a 2D surface) and/or database module 612, which can store user-created graphical objects and content for an online application or gaming server. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable inter-facing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or out-put devices (display device, speaker devices, printer, motor, etc.).

The audio/video input/output devices 614 can include a user input device (e.g., a mouse, a touchscreen, a touchpad, a microphone, etc.) that can be used to receive user input, a display device (e.g., screen, monitor, touchscreen etc.) and/or a combined input and display device, that can be used to provide graphical and/or visual output.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online application platform 102 is described as performing operations as described in some implementations herein, any suitable component or combination of components of online application platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse or touchpad for capturing user input, a gesture device for recognizing a user gesture, a VR/AR input device (e.g., such as an orientation sensor) for recognizing a head pose or gaze, a touchscreen to detect user input, a microphone to capture user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:

providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar;

receiving first indication that the avatar is within a threshold distance of the at least one interactive displayed graphical element within the virtual experience and second indication that the at least one interactive displayed graphical element is within a viewport associated with the avatar;

receiving an activation signal to activate the 2D interaction mode;

in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar;

receiving a selection of one or more of the bounding box representations;

performing a function associated with the selection, the function being identical to an associated function of the at least one interactive graphical element;

receiving third indication of one or more of:

the avatar is not within the threshold distance, the at least one interactive displayed graphical element is not viewable within the viewport, or the activation signal is not active; and deactivating the provided projection responsive to the third indication.

2. The computer-implemented method of claim 1, wherein the at least two portions of the at least one interactive displayed graphical element are 3D elements rendered for display onto the at least one interactive displayed graphical element, and wherein the bounding box representations are projections of the 3D elements onto 2D space.

3. The computer-implemented method of claim 1, wherein the threshold distance is a distance measured from the viewport associated with the avatar to the at least one interactive displayed graphical element in the virtual experience.

4. The computer-implemented method of claim 1, wherein the second indication that the at least one interactive displayed graphical element is within the viewport comprises indication that a view of the at least one displayed graphical element from the avatar has less than a threshold amount of obstruction.

5. The computer-implemented method of claim 4, wherein the threshold amount of obstruction is fifty percent obstruction.

6. The computer-implemented method of claim 1, wherein the activation signal is a toggle signal controlled by the user in control of the avatar, and wherein the toggle signal is controlled by one or more of: a selectable keyboard key, a hot key combination on a keyboard, a dedicated button on a gamepad, a button on a mobile device, or a graphical user interface element rendered on a display device.

7. The computer-implemented method of claim 1, further comprising scaling the provided projection to match a size of the at least one interactive displayed graphical element based upon an actual distance between the viewport and the at least one interactive displayed graphical element, and from a perspective of the avatar.

8. The computer-implemented method of claim 1, wherein the bounding box representations are non-overlapping.

9. The computer-implemented method of claim 1, wherein each bounding box is an interactive element linked to an associated portion of the at least two portions.

10. A non-transitory computer-readable medium with instructions stored thereon that, responsive to execution by a processing device, causes the processing device to perform operations comprising:

providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar;

receiving first indication that the avatar is within a threshold distance of the at least one interactive displayed graphical element within the virtual experience and second indication that the at least one interactive displayed graphical element is within a viewport associated with the avatar;

receiving an activation signal to activate the 2D interaction mode;

in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar;

receiving a selection of one or more of the bounding box representations;

performing a function associated with the selection, the function being identical to an associated function of the at least one interactive graphical element;

receiving third indication of one or more of:

the avatar is not within the threshold distance, the at least one interactive displayed graphical element is not viewable within the viewport, or the activation signal is not active; and deactivating the provided projection responsive to the third indication.

11. The non-transitory computer-readable medium of claim 10, wherein the at least two portions of the at least one interactive displayed graphical element are 3D elements rendered for display onto the at least one interactive displayed graphical element, and wherein the bounding box representations are projections of the 3D elements onto 2D space.

12. The non-transitory computer-readable medium of claim 10, wherein the threshold distance is a distance measured from the viewport associated with the avatar to the at least one interactive displayed graphical element in the virtual experience.

13. The non-transitory computer-readable medium of claim 10, wherein the second indication that the at least one interactive displayed graphical element is within the viewport comprises indication that a view of the at least one displayed graphical element from the avatar has less than a threshold amount of obstruction.

14. The non-transitory computer-readable medium of claim 13, wherein the threshold amount of obstruction is fifty percent obstruction.

15. The non-transitory computer-readable medium of claim 10, wherein the activation signal is a toggle signal controlled by the user in control of the avatar, and wherein the toggle signal is controlled by one or more of: a selectable keyboard key, a hot key combination on a keyboard, a dedicated button on a gamepad, a button on a mobile device, or a graphical user interface element rendered on a display device.

16. The non-transitory computer-readable medium of claim 10, wherein the operations further comprise scaling the provided projection to match a size of the at least one interactive displayed graphical element based upon an actual distance between the viewport and the at least one interactive displayed graphical element, and from a perspective of the avatar.

17. The non-transitory computer-readable medium of claim 10, wherein the bounding box representations are non-overlapping, and wherein each bounding box is an interactive element linked to an associated portion of the at least two portions.

18. A system, comprising:

a memory with instructions stored thereon; and a processing device, coupled to the memory and operable to access the memory, wherein the instructions when executed by the processing device, cause the processing device to perform operations including:

providing a three-dimensional (3D) virtual experience that includes at least one interactive displayed graphical element and a two-dimensional (2D) interaction mode, the at least one interactive displayed graphical element having at least two portions for interaction with by an avatar, and the 2D interaction mode being activatable by the avatar or a user in control of the avatar;

receiving first indication that the avatar is within a threshold distance of the at least one interactive displayed graphical element within the virtual experience and second indication that the at least one interactive displayed graphical element is within a viewport associated with the avatar;

receiving an activation signal to activate the 2D interaction mode;

in response to the first indication, the second indication, and the activation signal, automatically providing a projection of the at least two portions onto a 2D plane within the viewport associated with the avatar, the provided projection including bounding box representations of each portion of the at least two portions, and the bounding box representations being selectable by the avatar;

receiving a selection of one or more of the bounding box representations;

performing a function associated with the selection, the function being identical to an associated function of the at least one interactive graphical element;

receiving third indication of one or more of:
the avatar is not within the threshold distance,
    the at least one interactive displayed graphical element is not viewable within the viewport, or
    the activation signal is not active; and deactivating the provided projection responsive to the third indication.

\* \* \* \* \*